(12) United States Patent
Koka et al.

(10) Patent No.: US 8,606,113 B2
(45) Date of Patent: Dec. 10, 2013

(54) OPTICAL NETWORK WITH TUNABLE OPTICAL LIGHT SOURCES

(75) Inventors: Pranay Koka, Austin, TX (US); Michael O. McCracken, Austin, TX (US); Herbert D. Schwetman, Jr., Austin, TX (US); Xuexhe Zheng, San Diego, CA (US); Ashok V. Krishnamoorthy, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 254 days.

(21) Appl. No.: 13/180,340

(22) Filed: Jul. 11, 2011

(65) Prior Publication Data

US 2013/0016980 A1 Jan. 17, 2013

(51) Int. Cl.
*H04B 10/00* (2013.01)
*H04B 10/80* (2013.01)

(52) U.S. Cl.
CPC .................................. *H04B 10/801* (2013.01)
USPC ................ 398/164; 398/48; 398/49

(58) Field of Classification Search
USPC .................... 398/45, 48, 49, 82, 83, 164, 139
See application file for complete search history.

(56) References Cited

U.S. PATENT DOCUMENTS

| | | | |
|---|---|---|---|
| 4,580,872 A | 4/1986 | Bhatt et al. | |
| 4,809,264 A | 2/1989 | Abraham et al. | |
| 5,541,914 A | 7/1996 | Krishnamoorthy et al. | |
| 5,602,663 A | 2/1997 | Hamaguchi et al. | |
| 5,742,585 A | 4/1998 | Yamamoto et al. | |
| 5,943,150 A | 8/1999 | Deri et al. | |
| 6,021,263 A | 2/2000 | Kujoory et al. | |
| 6,289,021 B1 | 9/2001 | Hesse | |
| 6,633,542 B1 | 10/2003 | Natanson et al. | |
| 6,665,495 B1 | 12/2003 | Miles et al. | |
| 6,873,796 B1 | 3/2005 | Nakahira | |
| 7,298,974 B2 * | 11/2007 | Tanobe et al. | 398/63 |
| 7,336,900 B2 * | 2/2008 | DeCusatis et al. | 398/45 |
| 7,403,473 B1 | 7/2008 | Mehrvar et al. | |
| 7,804,504 B1 | 9/2010 | Agarwal | |
| 2002/0163693 A1 * | 11/2002 | Rubissa et al. | 359/128 |
| 2003/0214962 A1 | 11/2003 | Allaye-Chan et al. | |

(Continued)

OTHER PUBLICATIONS

Chae, Chang-Joon, "Optical CSMA/CD Media Access Scheme for Ethernet Over Passive Optical Network", IEEE, 2002.

(Continued)

*Primary Examiner* — Dalzid Singh
(74) *Attorney, Agent, or Firm* — Park, Vaughan, Fleming & Dowler LLP; Steven E. Stupp

(57) ABSTRACT

In a multi-chip module (MCM), integrated circuits are coupled by optical waveguides. These integrated circuits receive optical signals from a set of tunable light sources. Moreover, a given integrated circuit includes: a transmitter that modulates at least one of the optical signals when transmitting information to at least another of the integrated circuits; and a receiver that receives at least one modulated optical signal having a given carrier wavelength associated with the given integrated circuit when receiving information from at least the other of the integrated circuits. Furthermore, control logic in the MCM provides a control signal to the set of tunable light sources to specify carrier wavelengths in the optical signals output by the set of tunable light sources, thereby defining routing of at least the one of the optical signals in the MCM during communication between at least a pair of the integrated circuits.

20 Claims, 11 Drawing Sheets

(56) References Cited

U.S. PATENT DOCUMENTS

| | | |
|---|---|---|
| 2004/0037558 A1 | 2/2004 | Beshai |
| 2006/0251421 A1* | 11/2006 | Arnon .......................... 398/73 |
| 2009/0046572 A1 | 2/2009 | Leung |
| 2011/0103799 A1 | 5/2011 | Shacham et al. |

OTHER PUBLICATIONS

Desai, B.N., "An optical implementation of a packet-based (Ethernet) MAC in a WDM passive optical network overlay", 2000 Optical Society of America.

Krishnamoorthy, Ashok, "Computer Systems Based on Silicon Photonic Interconnects", Proceedings of the IEEE, vol. 97, No. 7, Jul. 2009.

Qin, Xiangdong, "Nonblocking WDM Switching Networks With Full and Limited Wavelength Conversion", 2002 IEEE.

Shacham, Assaf, "On the Design of a Photonic Network-on-Chip", Proceedings of the First International Symposium on Networks-on-Chip, 2007, IEEE.

Vantrease, Dana, "Corona: System Implications of Emerging Nanophotonic Technology", 2008, IEEE.

Wang, Howard, "Nanophotonic Optical Interconnection Network Architecture for On-Chip and Off-Chip Communications", OFC/NFOEC 2008.

Yang, Yuanyuan, "Designing WDM Optical Interconnects with Full Connectivity by Using Limited Wavelength Conversion", 2004 IEEE.

Battan, Christopher, "Building Manycore Processor-to-DRAM Networks with Monolithic Silicon Photonics", Proceedings of the 16th Symposium on High Performance Interconnects (HOT1-16), Aug. 2008.

* cited by examiner

OPTICAL NETWORK WITH TUNABLE OPTICAL LIGHT SOURCES

GOVERNMENT LICENSE RIGHTS

This invention was made with Government support under Agreement No. HR0011-08-9-0001 awarded by DARPA. The Government has certain rights in the invention.

CROSS REFERENCE TO RELATED APPLICATIONS

This application is related to U.S. patent application Ser. No. 13/180,355, entitled "Optical Network With Switchable Drop Filters," by Pranay Koka, Michael O. McCracken, Herbert D. Schwetman, Jr., Xuezhe Zheng, and Ashok V. Krishnamoorthy, filed 11 Jul. 2011, and to U.S. patent application Ser. No. 13/180,364, entitled "Arbitrated Optical Network Using Tunable Drop Filters," by Pranay Koka, Michael O. McCracken, Herbert D. Schwetman, Xuezhe Zheng, and Ashok V. Krishnamoorthy, filed 11 Jul. 2011 the contents of both of which are herein incorporated by reference.

BACKGROUND

1. Field

The present disclosure generally relates to optical networks. More specifically, the present disclosure relates to a multi-chip module (MCM) that includes integrated circuits that communicate via an optical network using tunable optical light sources, such as tunable-wavelength lasers.

2. Related Art

Wavelength division multiplexing (WDM), which allows a single optical link to carry multiple channels, can provide: very high bit-rates, very high bandwidth densities and very low power consumption. As a consequence, researchers are investigating the use of WDM to facilitate inter-chip communication. For example, in one proposed architecture chips (which are sometimes referred to as 'sites') in an array (which is sometimes referred to as an MCM or a 'macrochip') are coupled together by an optical network that includes optical interconnects (such as silicon optical waveguides).

In order to use photonic technology in interconnect applications, an efficient design is needed for the optical network. In particular, the optical network typically needs to provide: a high total peak bandwidth; a high bandwidth for each logical connection between any two sites in the array; low arbitration and connection setup overheads; low power consumption; and bandwidth reconfigurability.

A variety of network topologies having different characteristics and contention scenarios have been proposed to address these challenges in interconnect applications. One existing network topology, a static WDM point-to-point optical network, is shown in FIG. 1. In this network topology, an array of integrated circuits or chips 0-3 (which are each located at a 'site' in the array) are coupled by silicon optical waveguides using two carrier wavelengths (represented by the solid and dotted arrows). Note that the optical network in FIG. 1 is a fully connected point-to-point optical network. In particular, each site has a dedicated channel to every other site. Channels to all the sites in a column of the array (which are conveyed by different carrier wavelengths output by non-tunable light sources) may be multiplexed using WDM onto a single waveguide that runs from the source site and visits each site in the column, where a wavelength-selective 'drop filter' redirects one of the multiplexed wavelengths to a destination site (in this case, the drop filters in row 1 pick off the first carrier wavelength, and the drop filters in row 2 pick off the second carrier wavelength, so the carrier wavelength is used for routing). As illustrated by the bold line, in FIG. 1 chip 0 communicates with chips 1 and 3.

A key property of this optical network is the lack of arbitration overhead, which allows low minimum latency and high peak utilization for uniform traffic patterns. Furthermore, this optical network uses no switching elements, which results in low optical power loss in the optical waveguides. However, the bandwidth in the optical waveguides is statically allocated, which constrains the available bandwidth between any two sites. For example, in a macrochip that includes 64 chips arranged in an 8×8 array, with a peak system bandwidth of 20 TB/s, a total transmit bandwidth of 320 GB/s and a total receive bandwidth of 320 GB/s for each site, the bandwidth between any two sites is 5 GB/s, because each site has 64 outgoing optical waveguides so that each optical waveguide only has $\frac{1}{64}^{th}$ of the total site bandwidth. This constraint can lead to low performance for workloads that heavily stress a subset of the optical waveguides.

Other proposed network topologies have attempted to address this problem at the cost of: additional power consumption (such as that associated with switches), optical signal loss, increased area, constraints on the total transmit and receive bandwidths, constraints on the optical waveguide density, latency associated with setting up switches, and/or arbitration overhead associated with shared resources (which can be a performance bottleneck for workloads consisting of short messages). To date, the tradeoffs between the improved site-to-site bandwidth and the costs in these other approaches do not successfully address the challenges in implementing optical networks in interconnect applications.

Hence, what is needed is an MCM with an optical network that does not suffer from the above-described problems.

SUMMARY

One embodiment of the present disclosure provides an MCM. This MCM includes integrated circuits that receive optical signals from a set of tunable light sources. A given integrated circuit includes: a transmitter that modulates at least one of the optical signals when transmitting information to at least another of the integrated circuits; and a receiver that receives at least one modulated optical signal having a given carrier wavelength associated with the given integrated circuit when receiving information from at least the other of the integrated circuits. Moreover, the MCM includes first optical waveguides, optically coupled to the integrated circuits, that convey modulated optical signals from transmitters in the integrated circuits, and second optical waveguides, optically coupled to the first optical waveguides, that convey the modulated optical signals to receivers in the integrated circuits. Furthermore, control logic in the MCM provides a control signal to the set of tunable light sources to specify carrier wavelengths in the optical signals output by the set of tunable light sources, thereby defining routing of at least the one of the optical signals in the MCM during communication between at least a pair of the integrated circuits.

In the MCM, communication between the pair of integrated circuits may be contention free.

Note that the integrated circuits may be arranged in an array. The first optical waveguides may be optically coupled to rows in the array (or, more generally, a first direction in the array), and the second optical waveguides may be optically coupled to columns in the array (or, more generally, a second direction in the array). Moreover, a carrier wavelength associated with an integrated circuit along a given column in the array may be different from the carrier wavelengths associated with other integrated circuits in the given column. However, a first carrier wavelength associated with an integrated circuit along a given column in the array may be the same as a second carrier wavelength associated with another integrated circuit in another column in the array.

Furthermore, the first optical waveguides and the second optical waveguides may be implemented in different layers on a substrate, and the MCM may include interlayer couplers that optically couple the first optical waveguides and the second optical waveguides. For example, the first optical waveguides and the second optical waveguides may be implemented on the substrate using silicon-on-insulator technology.

Additionally, the control signal may specify a number of tunable light sources in the set of tunable light sources having the given carrier wavelength, thereby specifying a bandwidth during communication between at least the pair of the integrated circuits.

In some embodiments, the MCM includes static drop filters optically coupled to the second optical waveguides and the given integrated circuit. These static drop filters may pass a non-adjustable band of wavelengths including the given carrier wavelength to the given integrated circuit. Alternatively or additionally, the MCM may include switchable drop filters optically coupled to the second optical waveguides and the given integrated circuit. These switchable drop filters may pass an adjustable band of wavelengths to the given integrated circuit, where the adjustable band of wavelengths may include one of: the given carrier wavelength and another wavelength (such as an unused carrier wavelength).

In some embodiments, the MCM includes tunable drop filters optically coupled to the first optical waveguides and the given integrated circuit. These tunable drop filters may pass an adjustable band of wavelengths including one of the carrier wavelengths to the first optical waveguides. Alternatively or additionally, the MCM may include switchable drop filters optically coupled to the first optical waveguides and the given integrated circuit. These switchable drop filters may pass an adjustable band of wavelengths to the first optical waveguide, where the adjustable band of wavelengths includes one of: the given carrier wavelength and another wavelength (such as an unused carrier wavelength).

Another embodiment provides a system that includes: the set of tunable light sources that output optical signals having carrier wavelengths specified by the control signal; and the MCM.

Another embodiment provides a method for routing optical signals in the MCM. During the method, a control signal is selected based on desired communication between at least the pair of integrated circuits in the MCM, which are optically coupled by optical waveguides, where the given integrated circuit modulates at least one of the optical signals when transmitting information to at least another of the integrated circuits and receives at least one modulated optical signal having the given carrier wavelength associated with the given integrated circuit when receiving information from at least the other of the integrated circuits. Then, the control signal is provided to the set of tunable light sources to specify carrier wavelengths in optical signals output by the set of tunable light sources, thereby passively defining routing of at least the one of the optical signals in the MCM during communication between at least the pair of integrated circuits.

Figure 1:
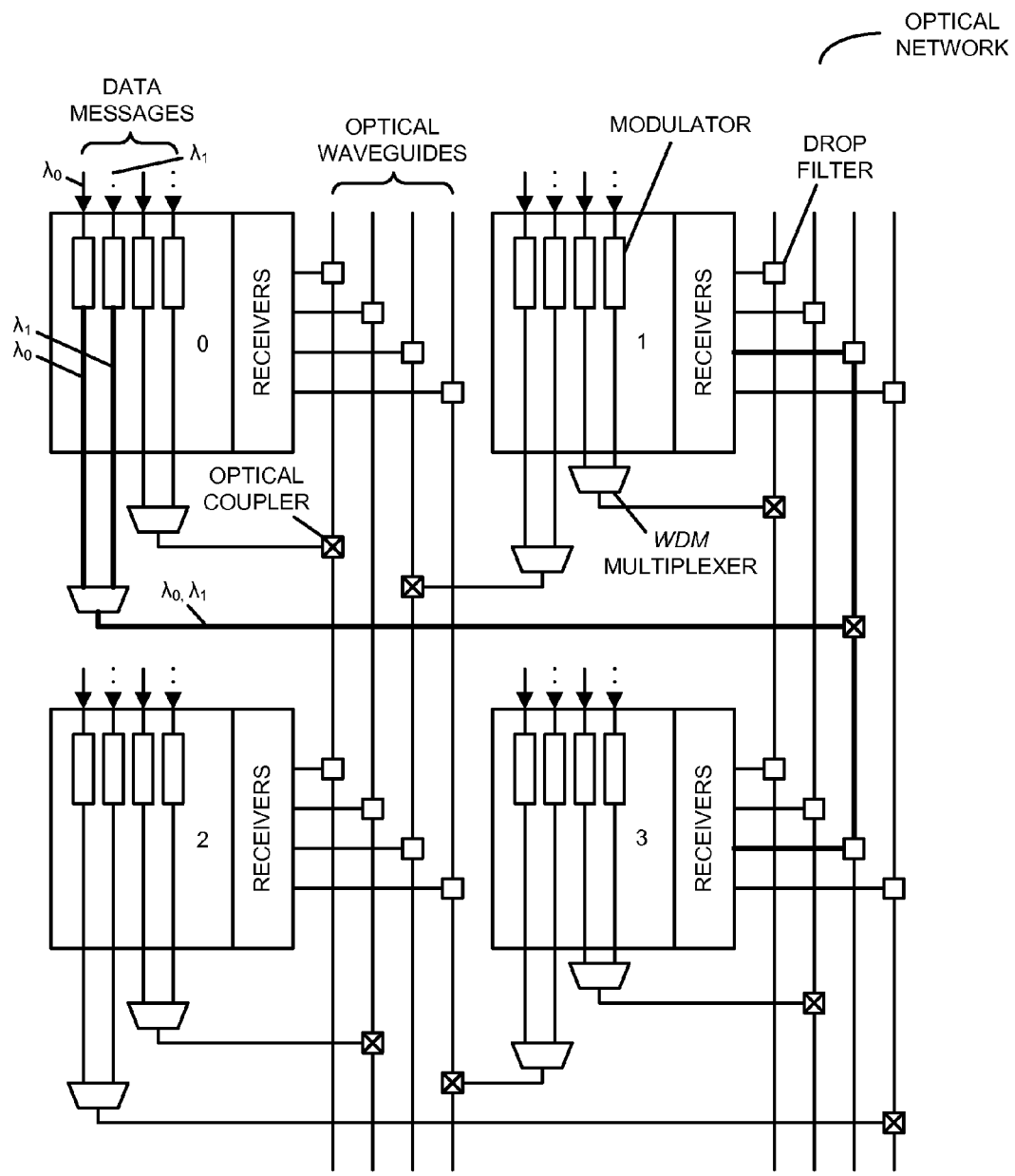
FIG. 1 is a block diagram illustrating an existing static point-to-point optical network.

Table 1 provides configuration information in an embodiment of an optical network in an MCM.

Note that like reference numerals refer to corresponding parts throughout the drawings. Moreover, multiple instances of the same part are designated by a common prefix separated from an instance number by a dash.

DETAILED DESCRIPTION

Embodiments of an MCM, a system that includes the MCM, and a method for routing optical signals in the MCM are described. In this MCM, integrated circuits are coupled by optical waveguides. These integrated circuits receive optical signals from a set of tunable light sources which may be external to the MCM. Moreover, a given integrated circuit includes: a transmitter that modulates at least one of the optical signals when transmitting information to at least another of the integrated circuits; and a receiver that receives at least one modulated optical signal having a given carrier wavelength associated with the given integrated circuit when receiving information from at least the other of the integrated circuits. Furthermore, control logic in the MCM provides a control signal to the set of tunable light sources to specify carrier wavelengths in the optical signals output by the set of tunable light sources, thereby defining routing of at least the one of the optical signals in the MCM during communication between at least a pair of the integrated circuits.

The optical network in the MCM provides a high, dynamically configurable, site-to-site bandwidth and has no contention among communicating integrated circuits. Moreover, access to this optical network does not require arbitration or any other form of contention resolution. Therefore, this optical network has a suitable balance of high bandwidth and low latency for use in interconnect applications.

Figure 2:
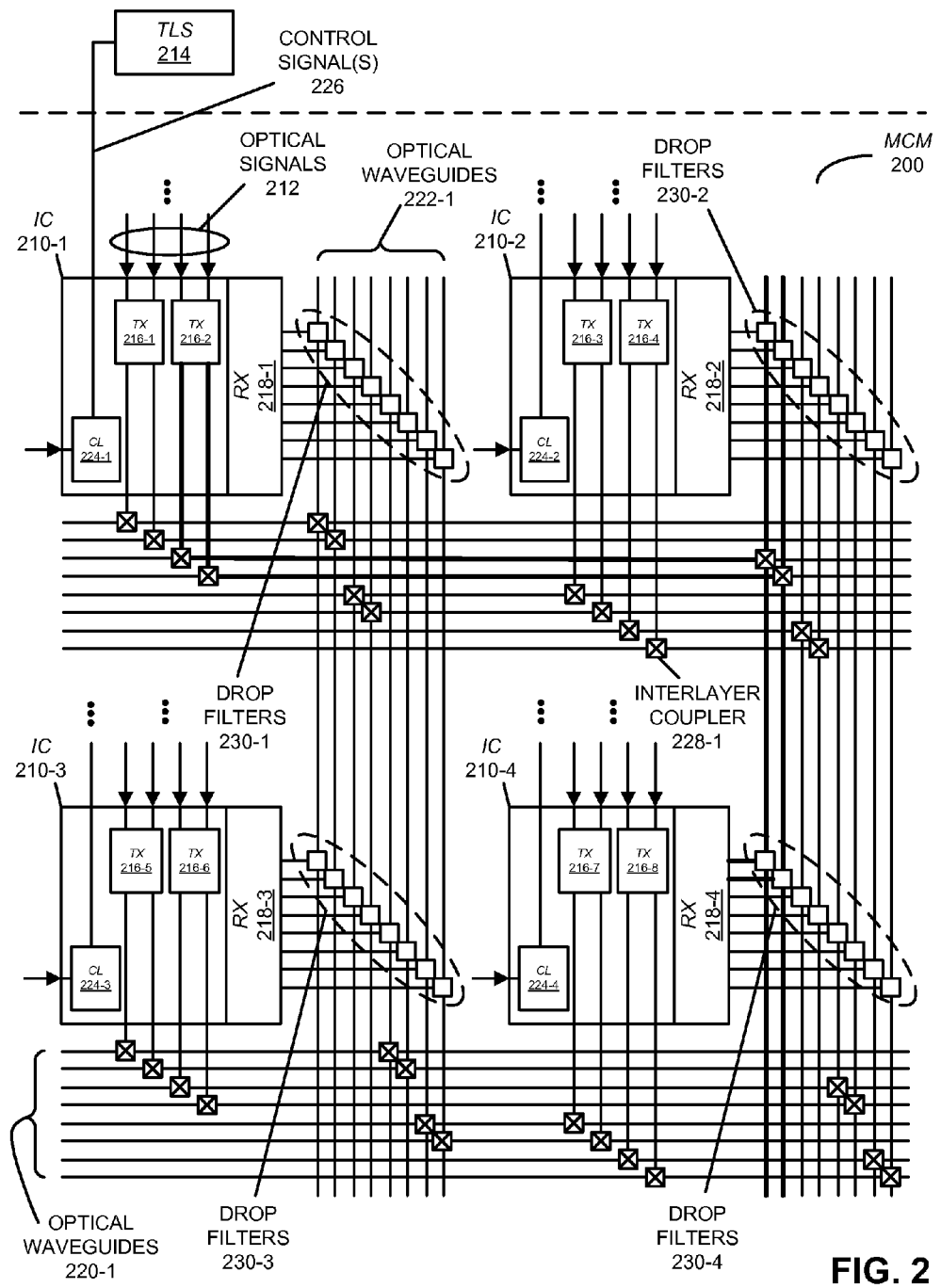
FIG. 2 is a block diagram illustrating optical communication in an MCM in accordance with an embodiment of the present disclosure.

We now describe embodiments of the MCM. FIG. 2 presents a block diagram illustrating optical communication in an MCM 200 (which is sometimes referred to as a 'macrochip'). This MCM provides a contention-free network that uses tunable lasers at the source and statically tuned drop filters at the destination (instead of switches) to route optical signals. The optical network in MCM 200 has a network topology with fewer parallel transfers (i.e., concurrent site-to-site communication) that can be dynamically reconfigured to increase the site-to-site bandwidth.

In particular, MCM 200 includes integrated circuits (ICs) 210 (such as processors and/or memory chips) that receive optical signals 212 from a set of tunable light sources (TLS) 214 (such as tunable-wavelength lasers), which may be external to MCM 200 (as indicated by the dashed line), and which may be optically coupled to MCM 200 by optical fiber(s). In this discussion, a tunable wavelength laser is a light source that can be tuned to any wavelength in the usable spectrum. A given integrated circuit in MCM 200 (such as integrated circuit 210-1) includes: a transmitter, such as transmitter (TX) 216-1, that modulates at least one of optical signals 212 when transmitting information to at least another of integrated circuits 210; and a receiver, such as receiver (RX) 218-1, that receives at least one modulated optical signal having a given carrier wavelength associated with the given integrated circuit when receiving information from at least the other of integrated circuits 210.

Moreover, MCM 200 includes optical waveguides (such as optical waveguides 220-1), optically coupled to the integrated circuits 210, that convey modulated optical signals from transmitters in integrated circuits 210, and optical waveguides (such as optical waveguides 222-1), optically coupled to the other optical waveguides, that convey the modulated optical signals to receivers in integrated circuits 210. Furthermore, control logic (CL) 224 in MCM 200 provides one or more control signals 226 to set of tunable light sources 214 (for example, using optical fibers) to specify carrier wavelengths in optical signals 212 output by set of tunable light sources 214. (In general, control logic 224 may be centralized or distributed in MCM 200.) In conjunction with static drop filters 230 optically coupled to the optical waveguides (such as optical waveguides 222-1) and the given integrated circuit, the one or more control signals 226 thereby defining routing of at least the one of optical signals 212 in MCM 200 during communication between at least a pair of integrated circuits 210. (As noted previously, communication between the pair of integrated circuits or sites in MCM 200 may be contention free.) Note that a static drop filter or add/drop filter is a static component that transfers or passes a non-adjustable band of wavelengths including the given carrier wavelength to the given integrated circuit, i.e., it is statically tuned to the given carrier wavelength. Aside from minor power loss, a static drop filter does not interfere with other carrier wavelengths.

As shown in FIG. 2, integrated circuits 210 may be arranged in an array. Some of the optical waveguides (such as optical waveguides 220-1) may be optically coupled to rows in the array (or, more generally, a first direction in the array), and the other optical waveguides (such as optical waveguides 222-1) may be optically coupled to columns in the array (or, more generally, a second direction in the array). Furthermore, in integrated circuits 210, the optical waveguides in the different directions may be physically separate components. For example, optical waveguides 220-1 and optical waveguides 222-1 may be implemented in different layers on a substrate (which eliminates waveguide crossings that can cause power loss and cross-talk problems), and MCM 200 may include interlayer couplers, such as interlayer coupler 228-1 (for example, an optical proximity connector) that optically couple the optical waveguides. Note that an interlayer coupler may transfer an optical signal in an optical waveguide in a layer to an optical waveguide in another layer that is vertically above or below the layer.

The optical waveguides may be implemented in a semiconductor layer on the substrate, and the optical signals or light in these optical waveguides may be highly confined because of the big difference between the index of refraction of the semiconductor layer and the surrounding material. While a wide variety of materials can be used in the semiconductor layer, in an exemplary embodiment silicon is used. Furthermore, this silicon semiconductor layer may be disposed on a buried-oxide layer which, in turn, is disposed on the substrate. Once again, a wide variety of materials may be used in the substrate, such as a semiconductor, glass or plastic. In an exemplary embodiment, silicon is used in the substrate, along with silicon dioxide in the buried-oxide layer. Consequently, in some embodiments, the substrate, the buried-oxide layer and the semiconductor layer may comprise a silicon-on-insulator (SOI) technology.

In an exemplary embodiment, the optical waveguides convey optical signals (i.e., light) having wavelengths between 1.1-1.7 µm, such as an optical signal having a fundamental wavelength of 1.3 or 1.55 µm. These optical waveguides may have thicknesses between 0.25 and 3 µm, and widths between 0.5 and 3 µm. Note that because the optical waveguides may have quasi-rectangular cross-sections, they may be quasi-single mode components. Moreover, the buried-oxide layer may have a thickness between 0.3 and 3 µm.

In an exemplary embodiment of the 2×2 array illustrated in FIG. 2, each optical waveguide carries two carrier wavelengths (which are associated with two one-bit data channels). Moreover, each site may receive light on only one associated statically assigned carrier wavelength. For example, integrated circuit 210-1 may receive light only on a green wavelength. (Thus, a carrier wavelength associated with an integrated circuit along a given column in the array may be different from the carrier wavelengths associated with other integrated circuits in the given column. However, in some embodiments a first carrier wavelength associated with an integrated circuit along a given column in the array is the same as a second carrier wavelength associated with another integrated circuit in another column in the array. Consequently, drop filters 230-1 and 230-2 may pick off one of the carrier wavelengths, and drop filters 230-3 and 230-4 may pick off the other carrier wavelength.) As shown in FIG. 2, each site may have a private set of two optical waveguides and two lasers to each column (which is sometimes referred to as a 'column-set').

Set of tunable light sources 214 may be tunable over the range of wavelengths. In this example, each light source may be tunable across two carrier wavelengths (such as red and green) based on the one or more control signals 226. For example, each site may have a control wavelength provided by a fixed light source (not shown). A given site may provide control information (such as one of the one or more control signals 226) to a tunable light source in set of tunable light sources 214 by modulating the control wavelength with the control information. For example, the control information may include: an identifier of the light source and an identifier for a target carrier wavelength. This control information may be interpreted by control logic in the tunable light source, which tunes the tunable light source to the target carrier wavelength.

In order to communicate with a destination site during operation of MCM 200, the source site may perform the following operations: choose the appropriate column-set; encode (or modulate) the input control wavelength with the identifier for the column-set and the identifier for the target carrier wavelength; and transmits data. Thus, because set of tunable light sources 214 communicates with a given column, the destination site can: select a pair of light sources, select or tune the carrier wavelength to select a site on a column, and (as described further below) select the number of light sources in set of tunable light sources 214 to specify the bandwidth. The remainder of the communication in MCM 200 may be statically configured. In this way, integrated circuit 210-1 can communicate with integrated circuit 210-4 using red light, and integrated circuit 210-1 can communicate with integrated circuit 210-2 using green light. Note that communication latency is incurred every time set of tunable light sources 214 is tuned to different carrier wavelengths. However, this communication latency is much less than the overhead associated with arbitrating for a data channel among the sites in a network topology that can have contention. (Note that if sites A, B, C, and D are interconnected, and site A sending to site C blocks site B sending to site D, then the topology is 'blocking' However, if site A and site B contend to send to site C, there is contention but the network is not blocking)

Based on the workflow/application, note that one site in MCM 200 can be configured to communicate with the entire network as a point-to-point optical network. (Alternatively, parallel communication between the sites can be supported.) Thus, N optical waveguides and N tunable light sources in set of tunable light sources 214 can all be used to communicate with one site on a column, or arbitrarily divided between different sites on a column. Consequently, the one or more control signals 226 may specify a number of tunable light sources in set of tunable light sources 214 having the given carrier wavelength, thereby specifying a bandwidth during communication between at least the pair of integrated circuits 210.

Depending on the power of each light source, in some embodiments a single light source may power multiple, independently modulated optical signals associated with multiple channels in the optical network. For example, suppose a tunable light source, such as a tunable laser, can provide 8 mW to a given integrated circuit, and that each optical waveguide needs 1 mW of optical power for reliable operation. To minimize the number of tunable lasers needed, one 8 mW tunable laser can be used to power eight optical links. Because the tunable laser only generates a single carrier wavelength, these eight optical links may use separate optical waveguides.

In optical networks without tunable laser sources, this is usually not an issue. Each of the eight split light streams may be modulated separately and routed independently. However, in an optical network that uses a tunable laser as part of the routing mechanism, this means that the eight light streams are no longer routed independently, i.e., tuning the laser affects all of them. This interdependence may limit the 'granularity' of bandwidth reconfigurability in the optical network in MCM 200. In the case of an 8×8 array having the network topology shown in FIG. 2, with the aforementioned split of 8 mW into eight channels, this granularity may limit the number of concurrent connections that the optical network can support.

While there are other approaches for organizing the power splitting, each has similar limitations. For example, if the tunable laser for a site is split along the optical waveguides going to one column so that one tunable laser feeds all the optical signals from a site to one column, then the site can only communicate with one site in that column at a time. However, in an 8×8 MCM it can use the full bandwidth of eight channels to talk to that one site. Note that, if there are multiple channels of the same carrier wavelength on different optical waveguides, a static drop filter can pick off one carrier wavelength at a given receiver site.

If the 2×2 array in FIG. 2 is scaled to an 8×8 array, and assuming that a WDM factor of eight is used (i.e., each optical waveguide carries eight carrier wavelengths), each tunable laser may be tunable across eight wavelengths. Consequently, a site in the array may have eight column-sets, which each include 16 waveguides. Note that each site can transmit on any one carrier wavelength in all of the column-sets simultaneously. Moreover, if each wavelength has a bit-rate of 20 Gb/s (or 2.5 GB/s), the outgoing bandwidth is 320 GB/s per site and the site-to-site link bandwidth is 40 GB/s. Table 1 provides configuration information in an embodiment of an optical network in an MCM with an 8×8 array.

TABLE 1

| | |
|---|---|
| Horizontal Optical Waveguides | 8192 |
| Vertical Optical Waveguides | 16,384 |
| Transmitters | 8192 |
| Receivers | 65,536 |
| Drop Filters | 8192 |
| Switchable Drop Filters | 0 |
| Tunable Drop Filters | 0 |
| Arbitration? | No |
| Bounded Clock Skew? | No |
| Dark Periods for Tuning? | No |
| Feedback to Tunable Light Sources? | Yes |
| Bandwidth Reconfigurability | Limited by granularity of light sources |
| Relative Optical Link Power Loss | Minimum |
| Per Packet Overhead | Depends on light-source response time |
| Relative Area Overhead | Maximum |

In summary, MCM 200 includes a contention-free optical network with tunable light sources (such as tunable-wavelength lasers) and without broadband switches or a global clock. This optical network has: low overhead, low power, high site-to-site bandwidth, and flexible allocation of bandwidth between a site and all sites in a destination column. The overall complexity of the network topology is not significantly increased relative to existing network topographies, such as a WDM point-to-point optical network. Because it requires no arbitration, a sending site can choose how much bandwidth to use to talk to a destination and can begin sending without the involvement of any other site. This results in lower latency and higher performance, especially with small messages. Furthermore, because the optical network avoids crossings of the optical waveguides, it is power efficient and reduces cross-talk.

Figure 3:
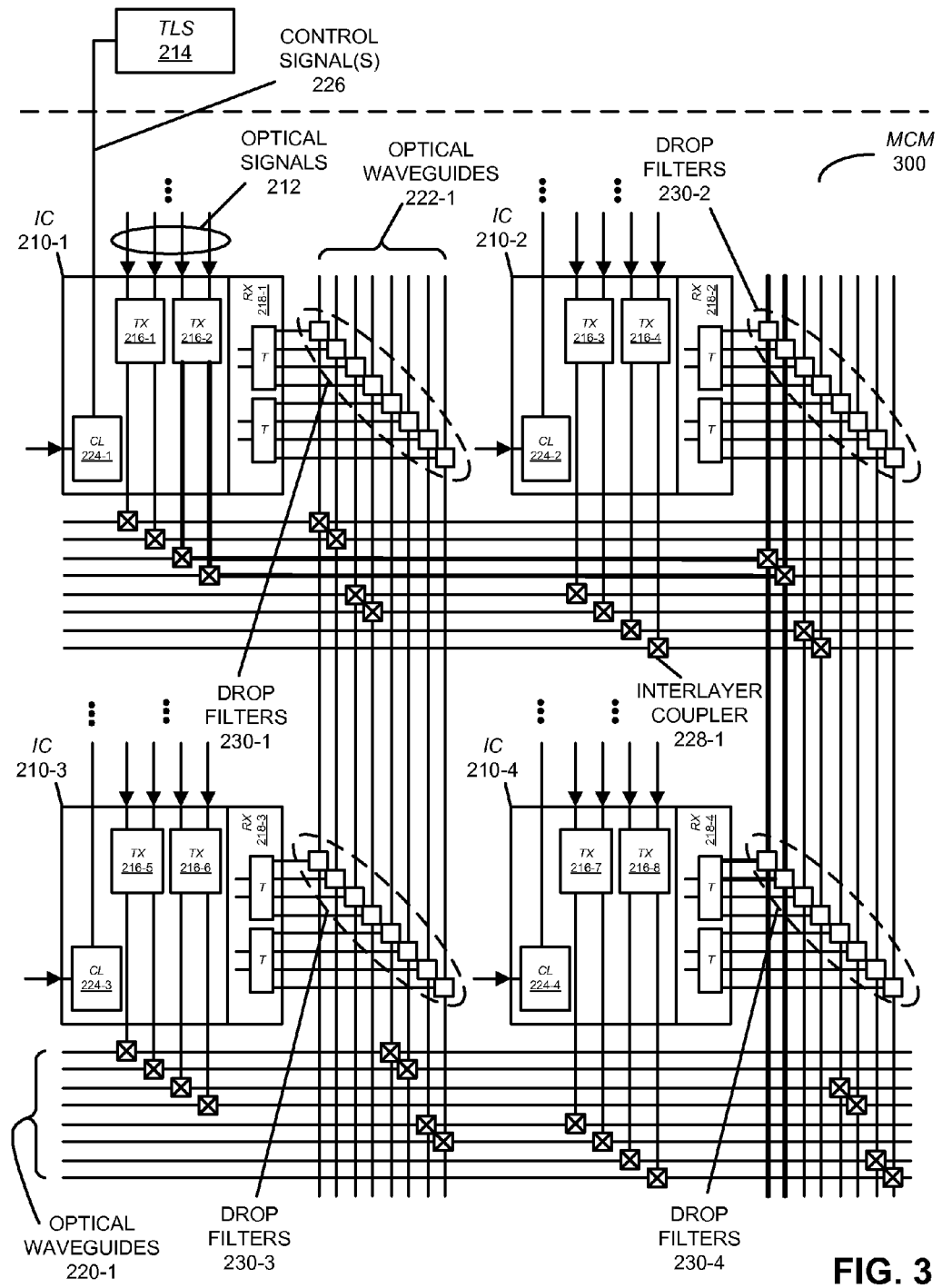
FIG. 3 is a block diagram illustrating optical communication in an MCM in accordance with an embodiment of the present disclosure.

In some embodiments, the MCM is modified to reduce the number of receivers at the expense of parallelism (which results in shared resources that will need arbitration or control). This is shown in FIG. 3, which presents a block diagram illustrating optical communication in an MCM 300. In this variation, which is sometimes referred to as a 'tunable wavelength laser with row-shared receivers,' the number of receivers in an 8×8 array is 128 per site, or 8192 total. This is the same as the existing WDM point-to-point optical network, as opposed to the 1024 per site or 65536 total in an 8×8 array-version of MCM 200 in FIG. 2 (which is sometimes referred to as a 'tunable wavelength laser-private column' optical network). This may be accomplished by placing an N-to-1 so-called 'tree switch' (T) at the receiving end of a link, which chooses among the links entering from an entire row of sites (and, thus, amounts to sharing the final part of the link among the sites in a row).

Figure 4:
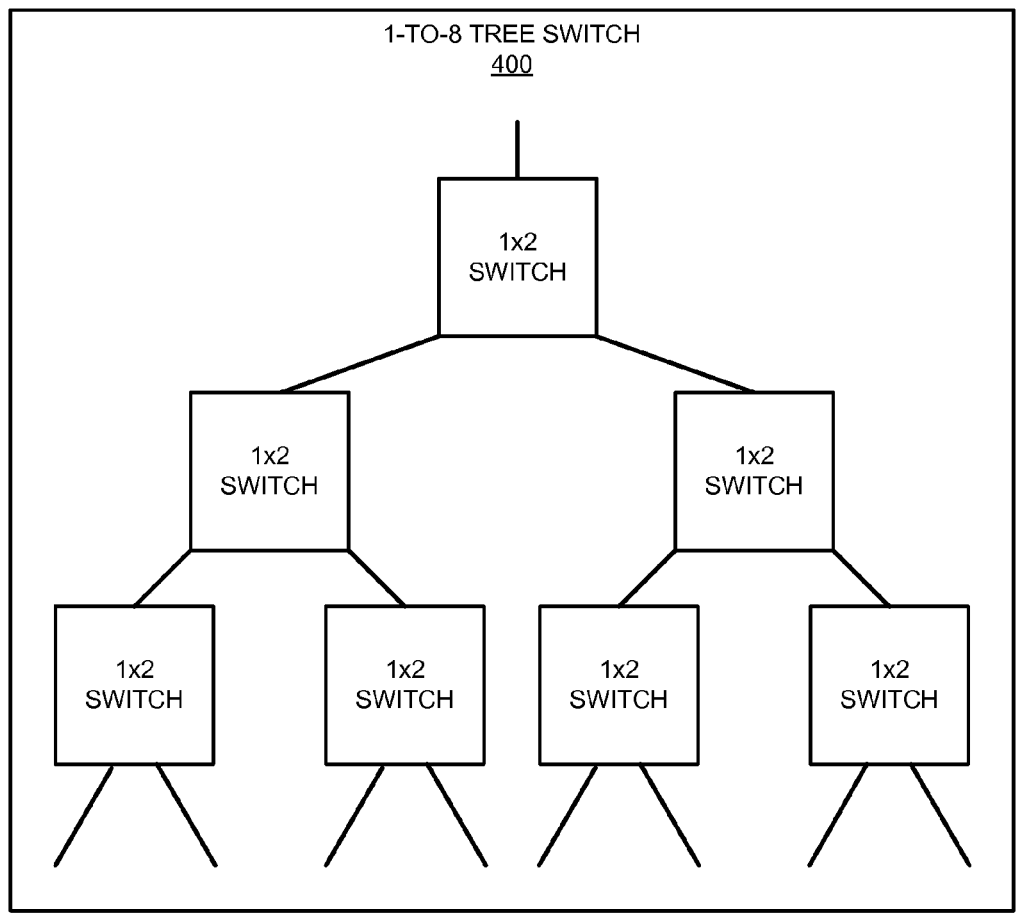
FIG. 4 is a block diagram illustrating a tree switch in accordance with an embodiment of the present disclosure.

FIG. 4 presents a block diagram illustrating a 1-to-8 tree switch 400. This tree switch includes multiple 1×2 optical switches, which each redirect light from an input to one of two outputs. The optical switches in tree switch 400 are arranged in a tree to create an effective 1×N optical switch. (Equivalently, the optical switches can be arranged to create an effective N×1 optical switch using multiple 2×1 optical switches, each of which redirects light from one of two inputs to an output.)

Because of the receiver sharing, the optical network in MCM 300 (FIG. 3) requires an arbitration technique, which will incur overhead for every message. In addition, the link power loss is increased relative to the optical network in MCM 200 (FIG. 2) because there are three wavelength-selective switches added to the path by the tree switch. However, there is a savings in area due to the reduced number of receivers.

In another embodiment, the MCM may include switchable drop filters optically coupled to the vertical optical waveguides and the given integrated circuit (i.e., switchable drop filters at the destination). These switchable drop filters may pass an adjustable band of wavelengths to the given integrated circuit, where the adjustable band of wavelengths may include one of: the given carrier wavelength and another wavelength, such as an unused carrier wavelength. Thus, the switchable drop filters may be dynamically tuned to be effectively 'off,' thereby enabling light to pass by it unchanged.

Figure 5:
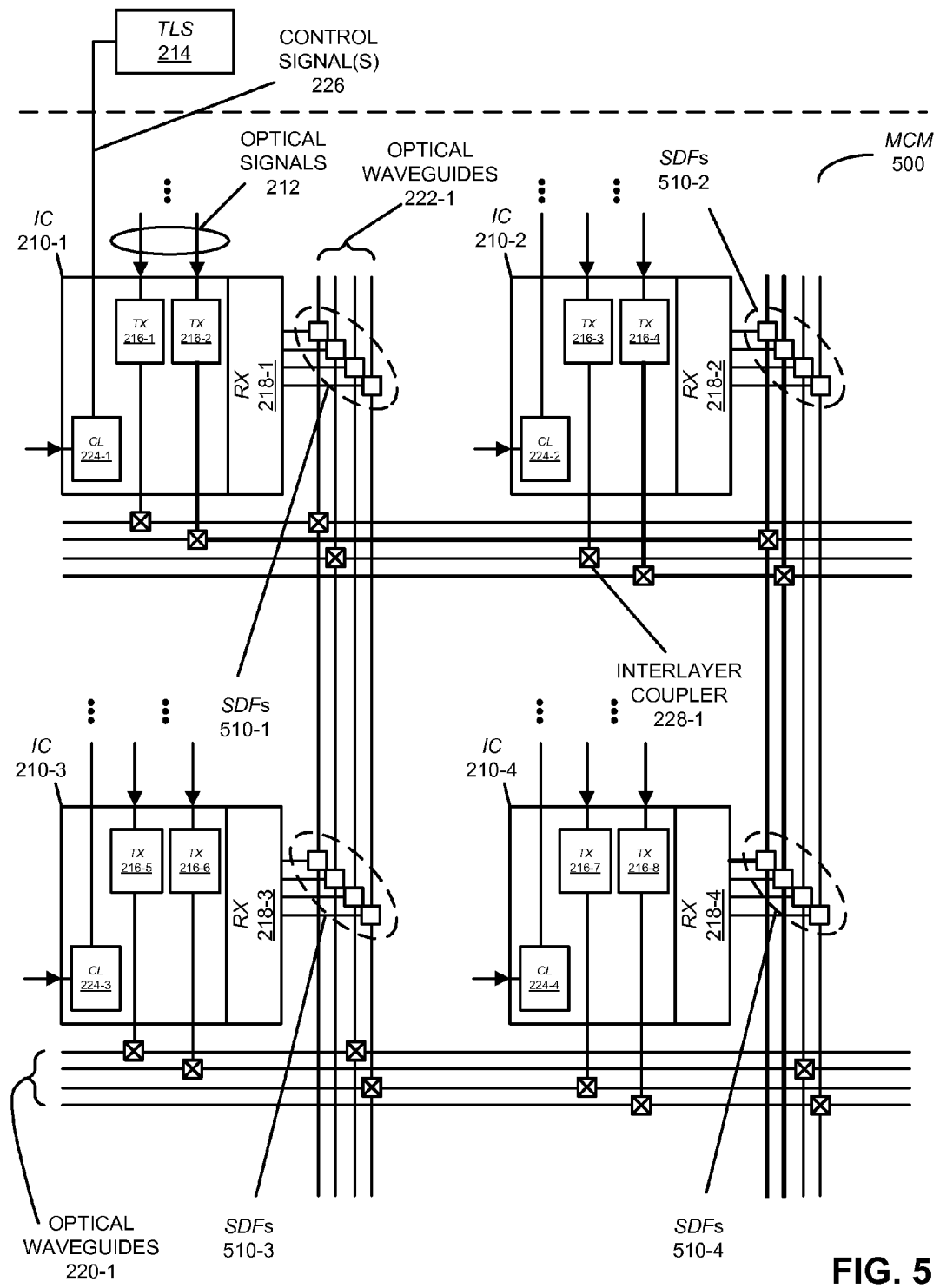
FIG. 5 is a block diagram illustrating optical communication in an MCM in accordance with an embodiment of the present disclosure.

This configuration is shown in FIG. 5, which presents a block diagram illustrating optical communication in an MCM 500 with switchable drop filters (SDFs) 510. This network topology may scale independently of the WDM factor, so the number of sites in a column or a row is independent of the number of carrier wavelengths in an optical waveguide, at the cost of some power consumption and performance. For example, an 8×8 array may be constructed using only four carrier wavelengths in each optical waveguide (i.e., a WDM factor of four), without requiring extra optical waveguides by using switchable drop filters 510 to allow link sharing. The amount of link sharing may depend on the size of the optical network and the WDM factor that is used.

FIG. 5 shows a 2×2 array with two rows sharing a wavelength. A sending site selects the optical waveguide that goes to the column of its destination. Then, the sending site selects the row-group (such as rows 1 and 2 or rows 3 and 4) by tuning the tunable laser. For example, in FIG. 5 integrated circuit 210-1 is sending along the waveguide for column 1 (counting from 0) in green, which selects the sites in the two rows (either integrated circuit 210-2 or 210-4). A separate control network may set switchable drop filters 510 appropriately at both sites in those two rows, thus picking the unique destination.

Note that, because of the reduction in the number of available wavelengths, this optical network reduces the number of simultaneous connections that can be sustained by a single site.

In another embodiment of the MCM, the MCM includes tunable drop filters optically coupled to the horizontal optical waveguides and the given integrated circuit. These tunable drop filters may pass an adjustable band of wavelengths including one of the carrier wavelengths to the horizontal optical waveguides. Thus, a tunable drop filter can be dynamically tuned to any carrier wavelength in the usable spectrum. It will then act exactly as a static drop filter would if tuned for that carrier wavelength.

Figure 6:
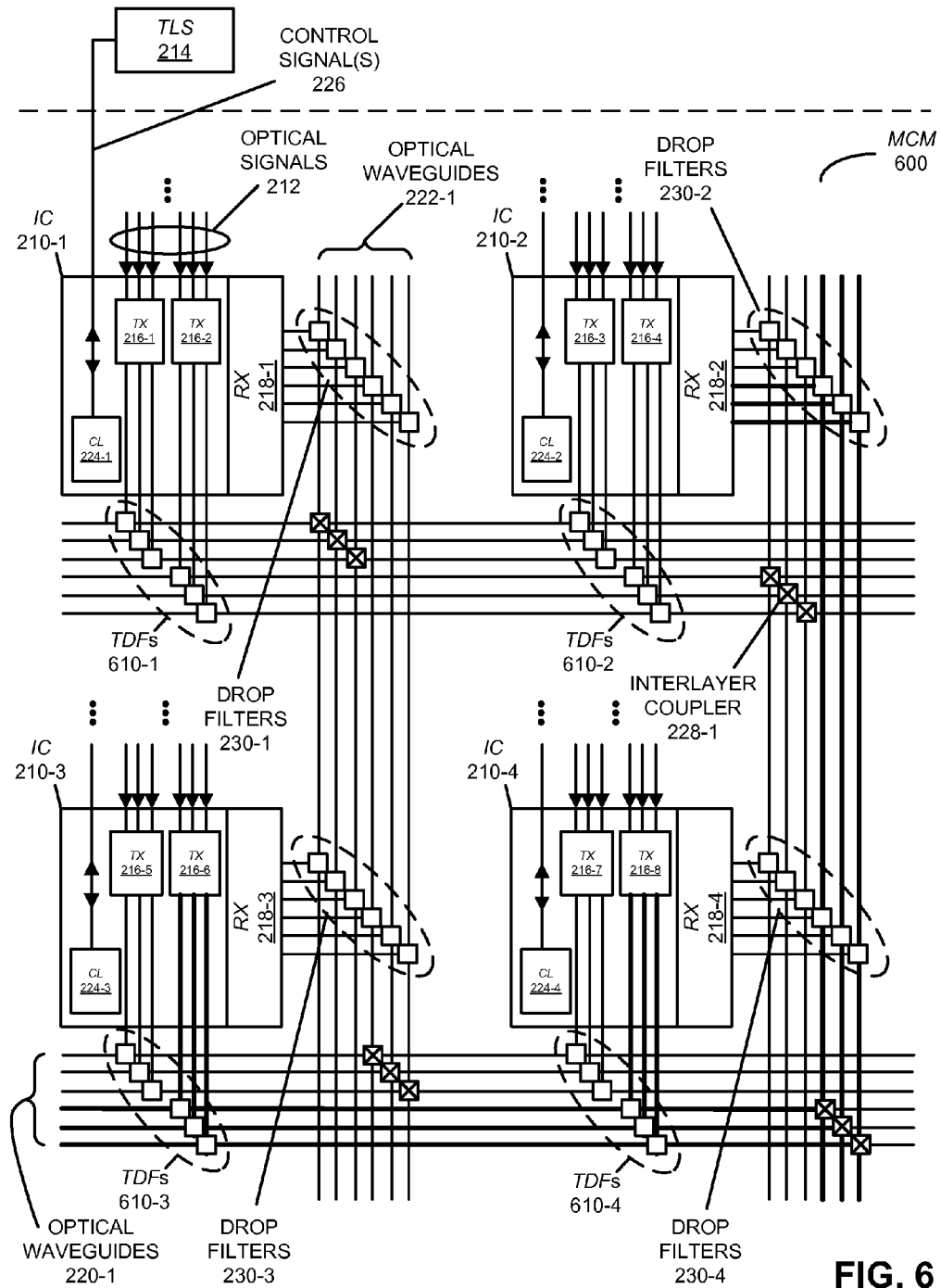
FIG. 6 is a block diagram illustrating optical communication in an MCM in accordance with an embodiment of the present disclosure.

This embodiment is shown in FIG. 6, which presents a block diagram illustrating optical communication in an MCM 600 with tunable drop filters (TDFs) 610. Because tunable drop filters 610 are proximate to the sending sites, they are easier to configure. Furthermore, the use of tunable drop filters 610 allows fewer optical waveguides to be used, at the cost of arbitration (because of the shared resources) and a dark period or latency when tunable drop filters 610 are configured. This network topology can achieve high bandwidth per link similar to switched shared-link networks, without the use of switches (which typically incur a large amount of power loss).

In MCM 600, each row of sites shares a link to a column. Moreover, each destination site in a column has a statically tuned drop filter along every optical waveguide in the column. During operation, a sending site chooses the optical waveguide that matches the column of its destination. Then, the sending site tunes its tunable-wavelength laser to the carrier wavelength corresponding to its destination, and tunes a tunable drop filter to guide its light onto the shared row optical waveguide. Consequently, the sites along a row arbitrate to determine which site(s) can use each of the shared links to a column. It is possible to have a large number of combinations of source site(s) and carrier wavelengths being used. For example, one site may use all the optical waveguides and one carrier wavelength to send a large message to one destination site; one site may use all the optical waveguides and all the carrier wavelengths to communicate with every site in the column; or multiple sites can split up the available channels. The design of an arbitration technique that can control this variety of options (as well as the arbitration in the other embodiments) is known to one of skill in the art.

In a variation on the optical network in FIG. 6, the shared row optical waveguides may be split into two segments, each having a separate vertical optical waveguide running to the destination. This approach can reduce the number of tunable drop filters along a path, which reduces the power loss of the link. To keep the receiver count the same, this may require adding a single switch at the destination end of each pair of optical waveguides to select from the two segments. It is also possible to simply double the number of receivers, with the corresponding tradeoff in area and power consumption.

In another variation on the optical network in FIG. 6, the MCM may include switchable drop filters (instead of at least some of the tunable drop filters 610) optically coupled to horizontal optical waveguides and the given integrated circuit. However, in some embodiments there may be N switchable drop filters for a single tunable drop filter. This is likely to result in a small area penalty and may be a useful option if the tunable drop filter has unacceptable signal loss parameters.

Figure 7:
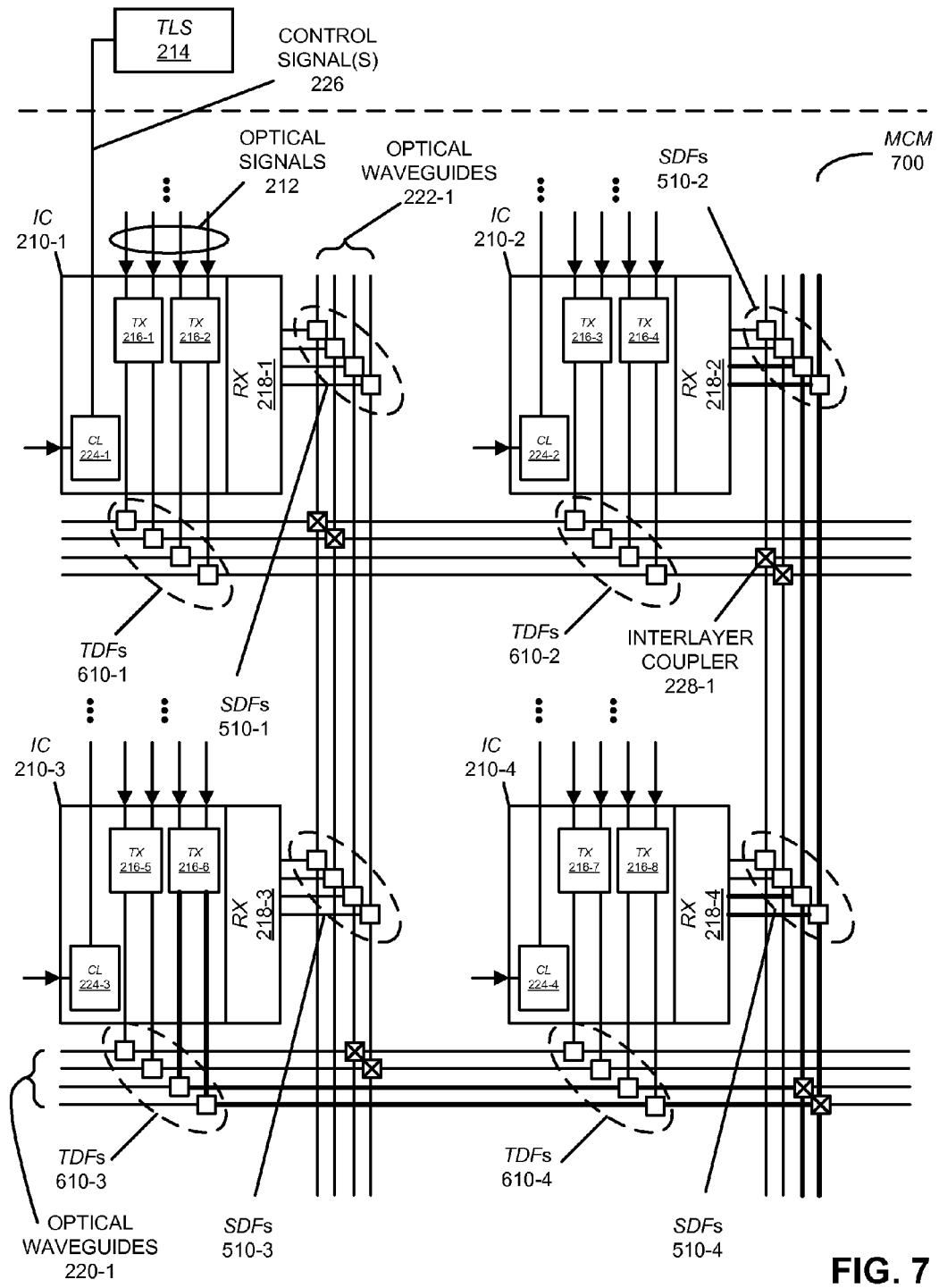
FIG. 7 is a block diagram illustrating optical communication in an MCM in accordance with an embodiment of the present disclosure.

FIG. 7 presents a block diagram illustrating optical communication in an MCM 700 with tunable drop filters 610 and switchable drop filters 510. This optical network provides high bandwidth per link with low link power loss by sharing links (which results in fewer optical waveguides) without using broadband switches. In addition, the optical network allows high scalability independent of the WDM factor. However, MCM 700 has arbitration (because of the shared resources) and a dark period or latency when tunable drop filters 610 are configured.

In MCM 700, a sending site shares a set of optical waveguides with the other sites in its row. It arbitrates for the right to send a particular optical wavelength on that set of waveguides. The sending site then sets its tunable-wavelength laser to the appropriate carrier wavelength. Because multiple rows 'listen' on the same carrier wavelength, the arbitration network also sends a control message to the destination and other site(s) that listen on the same carrier wavelength, telling them to set their switchable drop filters appropriately. Note that the tunable drop filter at the source may be used to share links so that different source sites can send to different destinations in the same column simultaneously as long as the destination sites do not listen on the same carrier wavelength.

In another embodiment of the MCM, the MCM can be modified by adding a tree of broadband switches at the source site to achieve higher point-to-point bandwidth (up to 2×higher). In this variation, switches at the source site (such as 2×1 and 1×2 switches) allow a single laser to be redirected to a group of columns instead of just one. The simplest example of this would be to group two columns' worth of inputs and use a single switch per input to choose to which column each input is directed. To retain the same private-column, non-arbitrated network topology as in MCM 200 (FIG. 2), this may require twice the number of optical waveguides, i.e., instead of each laser input having a private optical waveguide to a column, it will have two. Determining the best size of these groups involves a tradeoff between: flexibility, per-link bandwidth, power consumption and area. Once the switch or switch tree at the source picks the column to send into, the carrier wavelength that the tunable-wavelength laser is tuned to picks the site within the column. This embodiment can provide higher bandwidth per link and more flexible bandwidth allocation, at the cost of higher link loss because of the additional switches along a path and increased optical waveguide area.

Figure 8A:
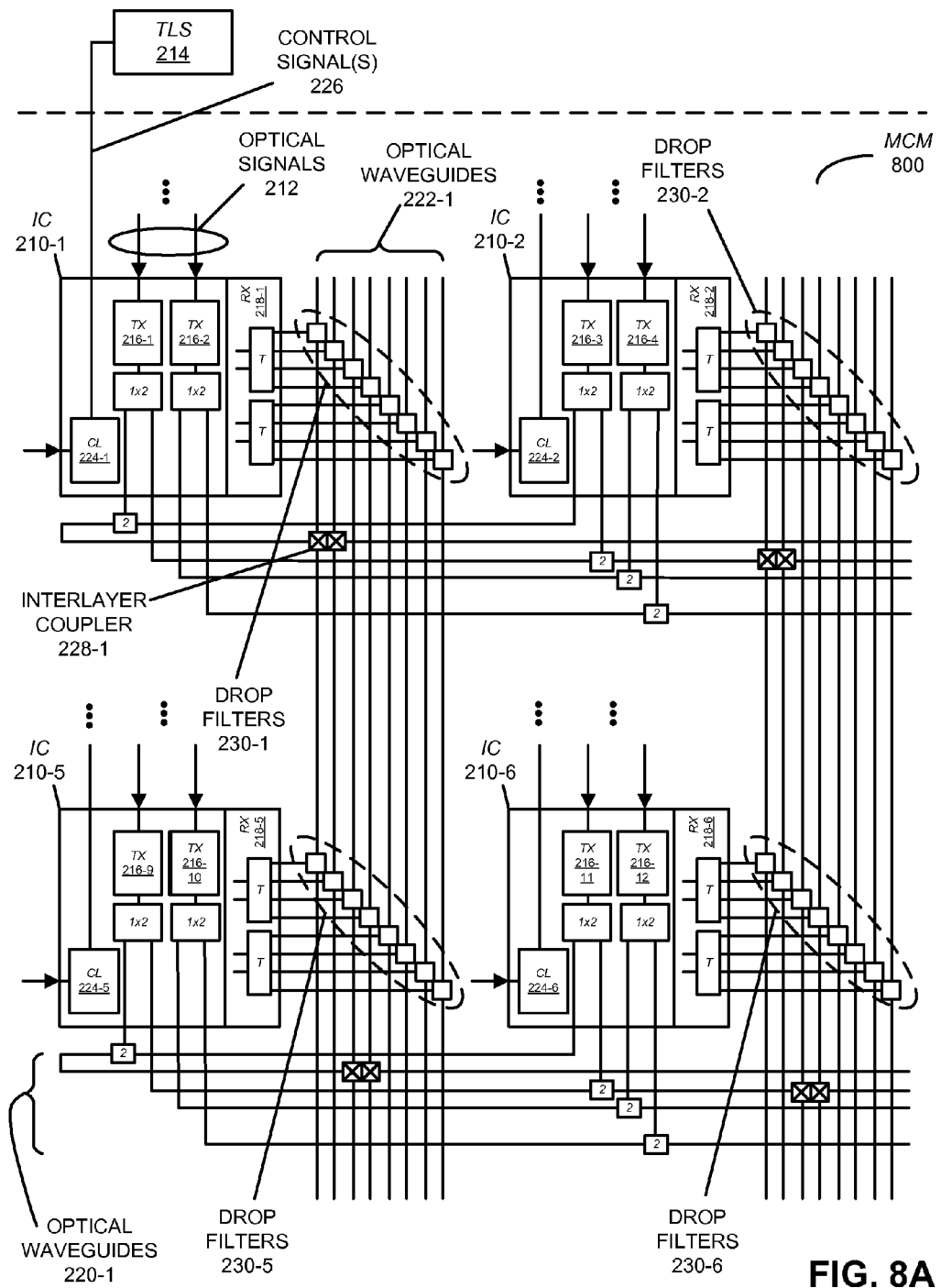
FIG. 8A is a block diagram illustrating optical communication in an MCM in accordance with an embodiment of the present disclosure.
Figure 8B:
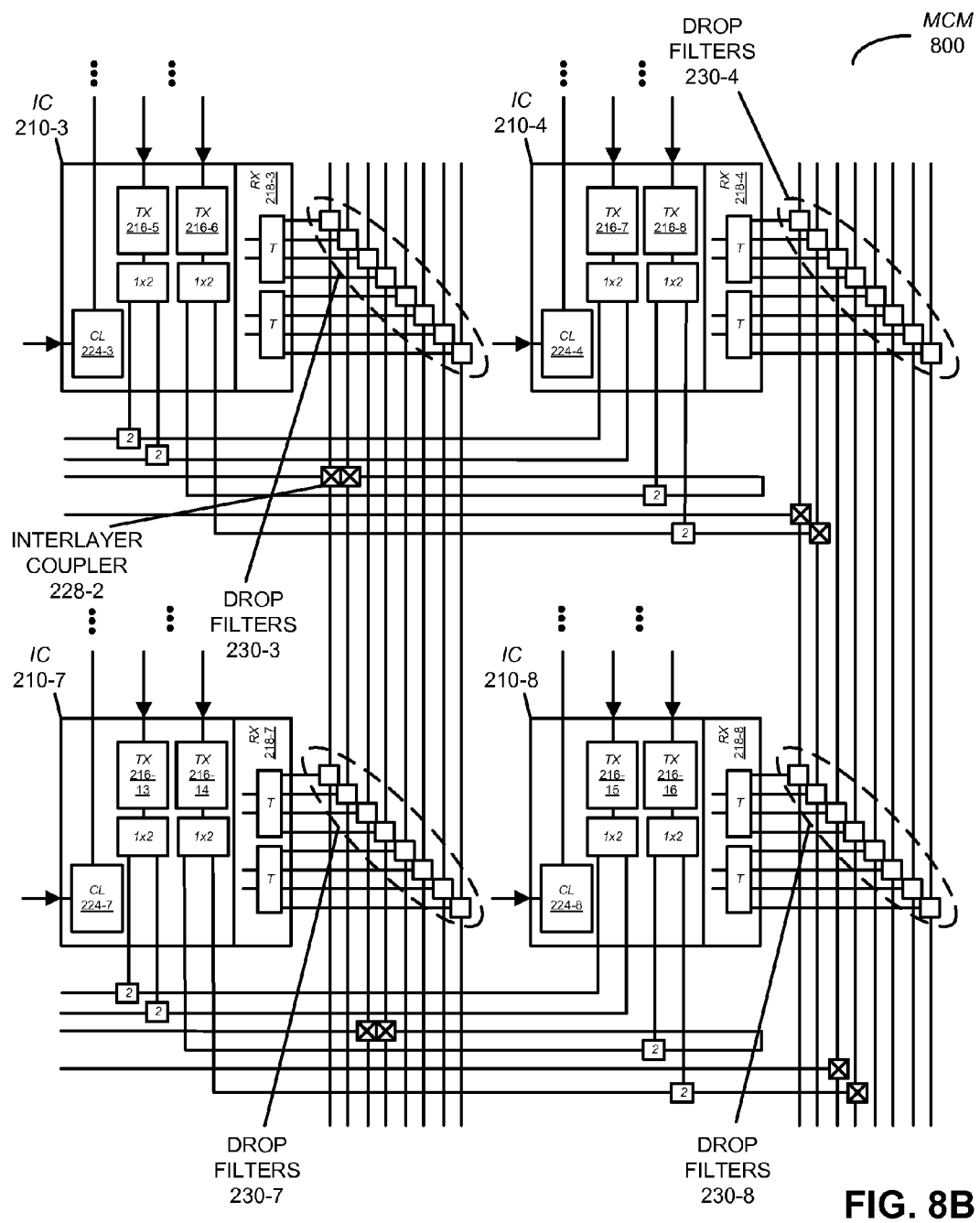
FIG. 8B is a block diagram illustrating optical communication in the MCM of FIG. 8A in accordance with an embodiment of the present disclosure.

FIGS. 8A and 8B presents a block diagram illustrating optical communication in a portion of 4×4 MCM 800 (which is sometimes referred to as a 'split shared source row'). In this MCM, the optical network uses tunable-wavelength lasers with a split shared source-row network topology. This configuration allows sites along the row to share optical waveguides, and to achieve higher per-link bandwidth using a minimal number of broadband switches in a path (with minimal associated optical loss).

In the optical network illustrated in FIGS. 8A and 8B, each row of sites is divided into two sets and each set shares a link to an entire column via tree of switches (T). Each destination site listens to all of the column optical waveguides on a single statically determined carrier wavelength. A sending site will arbitrate with the other sites in its row for access to a destination. The arbitration network may also convey a message to the destination to tell it how to set its tree of switches to select the optical signal from the winning sending site. Then, the sender tunes its tunable-wavelength laser connected to the optical waveguide that is coupled to the column of the destination to the carrier wavelength that matches that destination, and transmits data.

This optical network can be organized to vary the depth of the tree of switches at the source and destination to increase the bandwidth per link at the cost of more switches along a path (such as the 1×2 and 2×1 switches, which are denoted as '1×2' and '2,' respectively) and more optical waveguide area. The number of receivers required can also be controlled by varying the depth of the destination tree of switches, at the cost of more switches per link and a higher probability of destination blocking.

Figure 9:
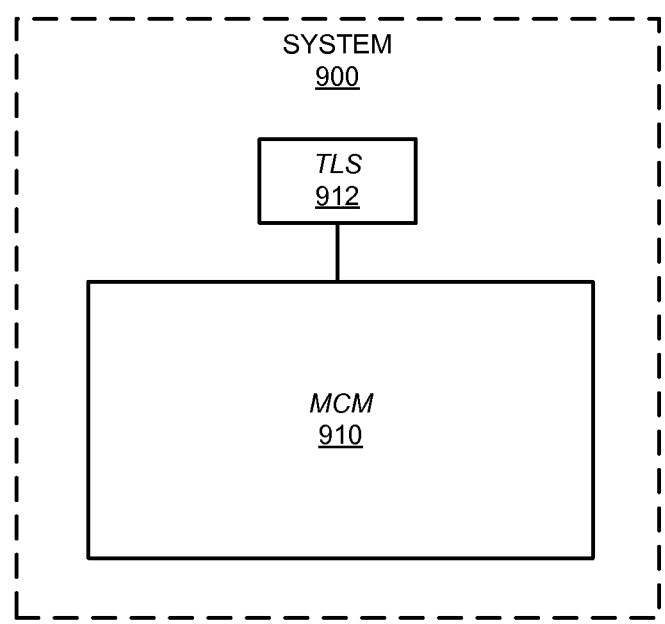
FIG. 9 is a block diagram illustrating a system that includes an MCM in accordance with an embodiment of the present disclosure.

The preceding embodiments of the MCM may be used in a variety of applications. This is shown in FIG. 9, which presents a block diagram illustrating a system 900 that includes an MCM 910 and set of set of tunable light sources 912. This set of tunable light sources outputs optical signals having carrier wavelengths specified by the control signal.

System 900 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device (such as a tablet computer), a supercomputer, a network-attached-storage (NAS) system, a storage-area-network (SAN) system, and/or another electronic computing device. Note that a given computer system may be at one location or may be distributed over multiple, geographically dispersed locations.

The preceding embodiments of the MCM, as well as system 900, may include fewer components or additional components. Although these embodiments are illustrated as having a number of discrete items, these MCMs and the system are intended to be functional descriptions of the various features that may be present rather than structural schematics of the embodiments described herein. Consequently, in these embodiments two or more components may be combined into a single component, and/or a position of one or more components may be changed. For example, the set of tunable light sources or lasers may be included on the MCM. In addition, functionality in the preceding embodiments of the MCMs and the system may be implemented more in hardware and less in software, or less in hardware and more in software, as is known in the art. For example, functionality may be implemented in one or more application-specific integrated circuits (ASICs) and/or one or more digital signal processors (DSPs).

While the preceding embodiments have been illustrated with particular components, configurations and network architectures, a wide variety of additional variations to the optical network in the embodiments of the MCM may be used, as is known to one of skill in the art, including: the use of additional or fewer components, arbitration techniques (as needed), etc.

Figure 10:
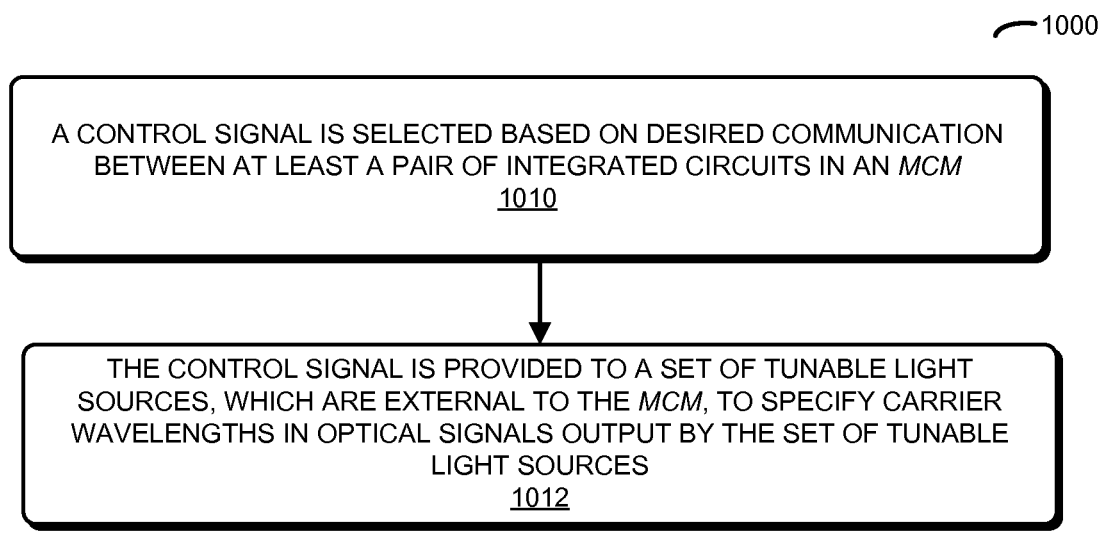
FIG. 10 is a flow chart illustrating a method for routing optical signals in an MCM in accordance with an embodiment of the present disclosure.

We now describe embodiments of a method for routing optical signals. FIG. 10 presents a flow chart illustrating a method 1000 for routing optical signals in an MCM, such as one of the preceding embodiments of the MCM. During the method, a control signal is selected based on desired communication between at least the pair of integrated circuits in the MCM (operation 1010), which are optically coupled by optical waveguides, where the given integrated circuit modulates at least one of the optical signals when transmitting information to at least another of the integrated circuits and receives at least one modulated optical signal having the given carrier wavelength associated with the given integrated circuit when receiving information from at least the other of the integrated circuits. Then, the control signal is provided to the set of tunable light sources to specify carrier wavelengths in optical signals output by the set of tunable light sources (operation 1012), thereby passively defining routing of at least the one of the optical signals in the MCM during communication between at least the pair of integrated circuits.

In some embodiments of method 1000, there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A multi-chip module (MCM), comprising:
integrated circuits configured to receive optical signals from a set of tunable light sources, wherein a given integrated circuit includes:
  a transmitter configured to modulate at least one of the optical signals when transmitting information to at least another of the integrated circuits; and
  a receiver configured to receive at least one modulated optical signal having a given carrier wavelength associated with the given integrated circuit during a time of receiving information from at least the other of the integrated circuits;
first optical waveguides, optically coupled to the integrated circuits, to convey modulated optical signals from transmitters in the integrated circuits;
second optical waveguides, optically coupled to the first optical waveguides, to convey the modulated optical signals to receivers in the integrated circuits; and
control logic configured to provide a control signal to the set of tunable light sources to specify carrier wavelengths in the optical signals output by the set of tunable light sources, thereby defining routing of at least the one of the optical signals in the MCM during communication between at least a pair of the integrated circuits.

2. The MCM of claim 1, wherein the integrated circuits are arranged in an array;
wherein the first optical waveguides are optically coupled to rows in the array; and
wherein the second optical waveguides are optically coupled to columns in the array.

3. The MCM of claim 2, wherein a carrier wavelength associated with an integrated circuit along a given column in the array is different from the carrier wavelengths associated with other integrated circuits in the given column.

4. The MCM of claim 2, wherein a first carrier wavelength associated with an integrated circuit along a given column in the array is the same as a second carrier wavelength associated with another integrated circuit in another column in the array.

5. The MCM of claim 1, wherein the first optical waveguides and the second optical waveguides are implemented in different layers on a substrate; and
wherein the MCM further includes interlayer couplers that optically couple the first optical waveguides and the second optical waveguides.

6. The MCM of claim 5, wherein the first optical waveguides and the second optical waveguides are implemented on the substrate using silicon-on-insulator technology.

7. The MCM of claim 1, wherein the control signal specifies a number of tunable light sources in the set of tunable light sources having the given carrier wavelength, thereby specifying a bandwidth during communication between at least the pair of the integrated circuits.

8. The MCM of claim 1, further comprising static drop filters optically coupled to the second optical waveguides and the given integrated circuit; and
wherein the static drop filters are configured to pass a non-adjustable band of wavelengths including the given carrier wavelength to the given integrated circuit.

9. The MCM of claim 1, wherein communication between the pair of integrated circuits is contention free.

10. The MCM of claim 1, further comprising switchable drop filters optically coupled to the second optical waveguides and the given integrated circuit;
wherein the switchable drop filters are configured to pass an adjustable band of wavelengths to the given integrated circuit; and
wherein the adjustable band of wavelengths includes one of: the given carrier wavelength and another unused carrier wavelength.

11. The MCM of claim 1, further comprising tunable drop filters optically coupled to the first optical waveguides and the given integrated circuit; and
wherein the tunable drop filters are configured to pass an adjustable band of wavelengths including one of the carrier wavelengths to the first optical waveguides.

12. The MCM of claim 1, further comprising switchable drop filters optically coupled to the first optical waveguides and the given integrated circuit;
wherein the switchable drop filters are configured to pass an adjustable band of wavelengths to the first optical waveguide; and
wherein the adjustable band of wavelengths includes one of: the given carrier wavelength and another unused carrier wavelength.

13. A system, comprising:
a set of tunable light sources configured to output optical signals having carrier wavelengths specified by a control signal;
integrated circuits optically coupled to the set of tunable light sources, wherein a given integrated circuit includes:
  a transmitter configured to modulate at least one of the optical signals when transmitting information to at least another of the integrated circuits; and
  a receiver configured to receive at least one modulated optical signal having a given carrier wavelength associated with the given integrated circuit during a time of receiving information from at least the other of the integrated circuits;
first optical waveguides, optically coupled to the integrated circuits, to convey modulated optical signals from transmitters in the integrated circuits;
second optical waveguides, optically coupled to the first optical waveguides, to convey the modulated optical signals to receivers in the integrated circuits; and
control logic optically coupled to the set of tunable light sources, wherein the control logic is configured to provide the control signal, thereby defining routing of at least the one of the optical signals in the system during communication between at least a pair of the integrated circuits.

14. The system of claim 13, wherein the first optical waveguides and the second optical waveguides are implemented in different layers on a substrate; and
wherein the system further includes interlayer couplers that optically couple the first optical waveguides and the second optical waveguides.

15. The system of claim 13, wherein the control signal specifies a number of tunable light sources in the set of tunable light sources having the given carrier wavelength, thereby specifying a bandwidth during communication between at least the pair of the integrated circuits.

16. The system of claim 13, further comprising static drop filters optically coupled to the second optical waveguides and the given integrated circuit; and wherein the static drop filters are configured to pass a non-adjustable band of wavelengths including the given carrier wavelength to the given integrated circuit.

17. The system of claim 13, further comprising switchable drop filters optically coupled to the second optical waveguides and the given integrated circuit;

wherein the switchable drop filters are configured to pass an adjustable band of wavelengths to the given integrated circuit; and wherein the adjustable band of wavelengths includes one of: the given carrier wavelength and another unused carrier wavelength.

18. The system of claim 13, further comprising tunable drop filters optically coupled to the first optical waveguides and the given integrated circuit; and wherein the tunable drop filters are configured to pass an adjustable band of wavelengths including one of the carrier wavelengths to the first optical waveguides.

19. The system of claim 13, further comprising switchable drop filters optically coupled to the first optical waveguides and the given integrated circuit;

wherein the switchable drop filters are configured to pass an adjustable band of wavelengths to the first optical waveguide; and wherein the adjustable band of wavelengths includes one of: the given carrier wavelength and another unused carrier wavelength.

20. A method for routing optical signals in an MCM, the method comprising:

selecting, by control signal selection logic, a control signal based on desired communication between at least a pair of integrated circuits in the MCM, which are optically coupled by optical waveguides, wherein a given integrated circuit modulates at least one of the optical signals when transmitting information to at least another of the integrated circuits and receives at least one modulated optical signal having a given carrier wavelength associated with the given integrated circuit when receiving information from at least the other of the integrated circuits; and providing the control signal to a set of tunable light sources to specify carrier wavelengths in optical signals output by the set of tunable light sources, thereby passively defining routing of at least the one of the optical signals in the MCM during communication between at least the pair of integrated circuits.

* * * * *

UNITED STATES PATENT AND TRADEMARK OFFICE
CERTIFICATE OF CORRECTION

PATENT NO.       : 8,606,113 B2                      Page 1 of 1
APPLICATION NO.  : 13/180340
DATED            : December 10, 2013
INVENTOR(S)      : Pranay Koka et al.

It is certified that error appears in the above-identified patent and that said Letters Patent is hereby corrected as shown below:

On the Title page, Item (75), please replace the fourth inventor's name "Xuexhe Zheng" with --Xuezhe Zheng--.

Signed and Sealed this
First Day of April, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,606,113 B2 | Page 1 of 1 |
| APPLICATION NO. | : 13/180340 | |
| DATED | : December 10, 2013 | |
| INVENTOR(S) | : Koka et al. | |

It is certified that error appears in the above-identified patent and that said Letters Patent is hereby corrected as shown below:

In the Specification
In column 7, line 22, delete "blocking)" and insert -- blocking.) --, therefor.

Signed and Sealed this
Seventh Day of July, 2015

Michelle K. Lee
*Director of the United States Patent and Trademark Office*